United States Patent [19]
Gillings

[11] 3,830,246
[45] Aug. 20, 1974

[54] FLUORIDE IMPREGNATED DENTAL FLOSS

[76] Inventor: Barrie R. D. Gillings, 121 Bannockburn Rd., Turramurra, New South Wales, Australia

[22] Filed: May 26, 1972

[21] Appl. No.: 257,391

[52] U.S. Cl. .................................. 132/89, 424/52
[51] Int. Cl. ............................................ A61c 15/00
[58] Field of Search ............ 132/89, 93, 91; 424/52; 15/159

[56] References Cited
UNITED STATES PATENTS

| | | | |
|---|---|---|---|
| 2,748,781 | 6/1956 | Collat | 132/93 |
| 2,667,443 | 1/1954 | Ashton | 424/52 |
| 3,076,218 | 2/1963 | Cook | 15/159 |
| 656,479 | 8/1900 | Schellenbach | 132/89 |
| 1,839,486 | 1/1932 | Lawton | 132/93 |
| 3,342,687 | 9/1967 | Gould | 424/52 |
| 3,175,951 | 3/1965 | Tucker | 424/52 |
| 2,772,205 | 11/1956 | King | 424/52 |

Primary Examiner—Louis G. Mancene
Assistant Examiner—Gregory E. McNeill
Attorney, Agent, or Firm—Cumpston, Shaw & Stephens

[57] ABSTRACT

A dental floss is impregnated with a dressing containing a fluoride in a form and quantity available to provide fluoride therapy as the floss is worked around and between the teeth. The dressing can also include flavoring materials and other dental therapy ingredients.

9 Claims, 1 Drawing Figure

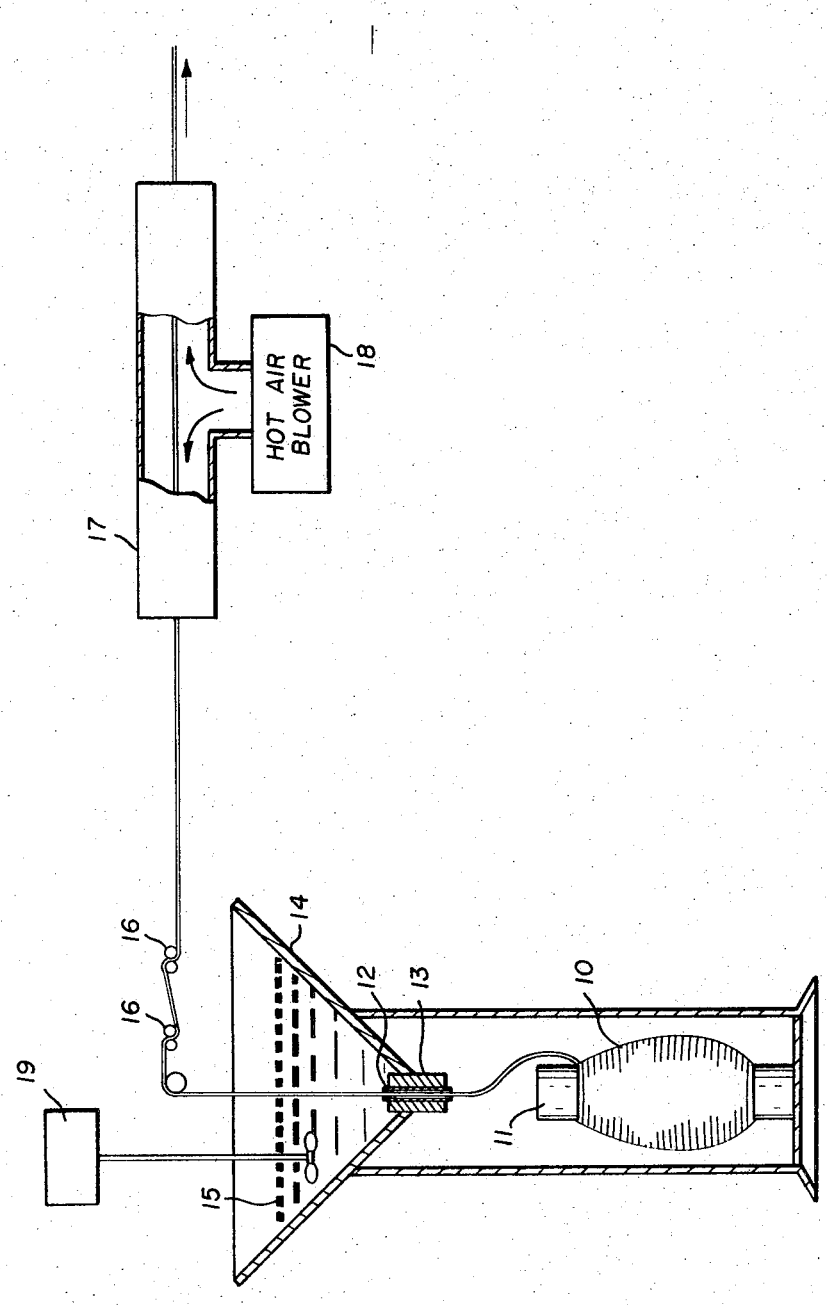

FLUORIDE IMPREGNATED DENTAL FLOSS

THE INVENTIVE IMPROVEMENT

Fluoride therapy has been widely used in preventive dentistry for more than 20 years, and fluorides have been included in toothpaste and drinking water, and have been applied to teeth in the dentist's office. There is some disagreement in the dental profession as to the mode of action of fluoride therapy, but it is clear that making fluorides available to the teeth reduces dental caries.

The invention involves recognition of a different and better way of applying fluoride to the teeth, and particularly to the interproximal regions of the teeth where dental caries is a special problem. The invention aims at simplicity, economy, and effectiveness in applying approved fluoride-containing substances to the teeth within acceptable standards of safety and preventive dentistry.

SUMMARY OF THE INVENTION

Improved fluoride therapy according to the invention is accomplished with a dental floss impregnated with a dressing containing a fluoride in a form and quantity available to provide fluoride therapy to the tooth surface as the floss is worked around and between the teeth. The invention includes practical ways of impregnating a dental floss with suitable fluorides and other materials useful in therapy and preventive dentistry, and floss dressings according to the invention can include flavoring materials as well as many materials of therapeutic value.

DRAWINGS

The drawing shows a schematic view of equipment for coating floss according to the invention.

DETAILED DESCRIPTION

Fluoride therapy for teeth is known to reduce dental caries or decay, but much remains to be learned about how the process works. It is known that a fluoride-containing substance in a form that makes fluoride available at the surface of the teeth does reduce caries, and such fluorides have been used in toothpaste, drinking water, and in liquid paste or gel applications in the dentist's office. Many fluorides are not acceptable because they are hazardous or do not release fluoride at the tooth surfaces, and the nature of satisfactory fluorides for dental therapy has limited the modes of application. Dental office treatment has included a fluoride applied directly to the teeth, and dental floss has been used to draw or work the fluoride over the tooth surfaces and into the interproximal regions between the teeth. Hence, dentists have generally been aware of the advantages of applying fluoride to the tooth surfaces but the methods of doing this have been unsatisfactory, especially in the relatively inaccessible interproximal regions.

The invention applies fluoride to the tooth surfaces in a better way with a dental floss impregnated with a dressing having a fluoride in a form and quantity available to provide fluoride therapy around and between the surfaces of the teeth as the floss is worked over the teeth. Satisfactory fluorides are preferably applied to the floss in finely divided form carried in a vehicle that is water-soluble, amorphous, and a semi-solid at room temperature. Polyethylene glycol is an excellent vehicle for suitable fluorides such as sodium fluoride, stannous fluoride or titanium tetrafluoride.

The preferred amount of fluoride in the dressing is about 0.03 to 0.04 milligrams per centimeter length of floss. One advantage of fluoride application by floss is that the fluoride is applied mostly to the tooth surfaces where it is desired, and excessive quantities of fluoride are not applied to the tongue, gums, and elsewhere in the mouth. Organic fluorides can also be used in the dressing, and a suitable fluoride can be encapsulated in a generally-known encapsulation process and the floss impregnated with a dressing containing the encapsulated fluoride. This has the advantage of releasing the fluoride only from the capsules that are ruptured in working the floss around and between the teeth so that the user does not receive an excessive amount of fluoride. Suitable capsules can be pressure-activated or water-soluble.

The preferred dressing is somewhat acid with a pH of less than 4.5, especially since it has been found that fluorides are transferred to the tooth enamel better in an acid environment. Preferred materials for producing this low pH when the inventive floss is used are sodium dihydrogen phosphate, phosphoric acid, and organic acids.

The preferred floss dressing also includes a flavoring material, preferably in encapsulated form, and a variety of flavors such as menthol and others are available in encapsulated form to be added to the dressing.

Other materials of therapeutic value or useful in preventive dentistry can also be added to a floss dressing according to the invention. These include calcium glycero-phosphate, organic Phosphates, essential oils, encapsulated materials, organic fluorides and polishing agents. The reasons for adding these ingredients is a matter of accumulating dental knowledge that may suggest other materials for the inventive floss coating.

The drawing shows a preferred way of applying a dressing to form the inventive dental floss. A multi-strand, continuous filament, nylon yarn 10 suitable for use as a dental floss is uncoiled from a spool 11 and drawn through a capillary tube 12 extending through a plug 13 in the bottom of a container 14 holding dressing material 15. Material 15 preferably uses a polyethylene glycol vehicle that is water soluble, amorphous, and semi-solid at room temperature. The preferred polyethylene glycol preferably has the consistency of soft butter. Suitable fluorides such as sodium fluoride and stannous fluoride are mixed with polyethylene glycol and the mixture is made somewhat acid, preferably by the addition of sodium dihydrogen phosphate and phosphoric acid. Preferably a flavoring material such as encapsulated menthol is added, and any of the previously described materials is added as desired. Of course, different fluorides, acids, flavorings, and vehicles can also be used if certain conditions are met. For example, the vehicle should be water-soluble to release the fluoride in the moist environment in the mouth; the fluoride containing substance must make fluoride available at the surface of the teeth; and all the ingredients must meet standards of health, safety and preventive dentistry.

Yarn 10 is drawn continuously up through dressing material 15 where the yarn intersticies fill with mateiral 15 containing finely divided fluorides and other ingredients as described above. Excess material is removed by wipers 16, and for substances in material 15 that require a little water to make them coatable, the coated floss is led through a drier 17 where a blower 18 directs warm air over the floss to dry up the moisture. An agitator 19 keeps material 15 agitated for even coating of the floss as it passes through container 14. Coating material 15 can also be heated above room temperature to lower its viscosity and facilitate the coating, and for some materials and viscosities, agitator 19 can be omitted.

Other coating methods can also be used according to the invention, and the preferred coating method is preferably suitable to the material and yarn being coated. For example, the coating can be applied continuously as the yarn is formed, and the yarn can be led through a coating bath and wiped free of excess in many different ways.

The fluoride therapy dressing according to the invention can be interspersed with other coatings for other therapy purposes. For example, segments of a dental floss can have fluoride therapy coatings separated by other coatings that are preferably color-coded and accomplish other purposes. Then fluoride can be applied to the teeth with one length of floss, and an organic acid to set the fluoride treatment can be subsequently applied with another length of floss.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the different coatings, materials, and methods available for therapy or preventive dentistry as applied around and between the teeth by a coated dental floss.

I claim:

1. A dental floss comprising:
   a. a multi-filament and strand having unbonded filaments free to spread apart as said strand is worked over surfaces of the teeth;
   b. a dressing impregnating said strand to fill the interstices between said filaments and to be released to said tooth surfaces as said filaments spread;
   c. said dressing including a water-soluble, amorphous vehicle that is semi-solid at room temperature;
   d. said dressing including a finely divided fluoride selected from the group consisting of sodium fluoride, a stannous fluoride, and titanium tetrafluoride;
   e. said fluoride being suspended in said vehicle and being insoluble in said vehicle;
   f. said floss containing about 0.03 to 0.04 milligrams of said fluoride per centimeter length of said floss; and
   g. said dressing including a phosphate acid buffer with the pH of said dressing being less than 4.5.

2. The floss of claim 1 wherein said dressing includes calcium glycero-phosphate.

3. The floss of claim 1 wherein said dressing includes an encapsulated flavoring material.

4. The floss of claim 1 wherein said fluoride is encapsulated.

5. The floss of claim 1 wherein said phosphate acid buffer includes an acid selected from the group consisting of sodium dihydrogen phosphate and phosphoric acid.

6. The floss of claim 1 wherein said vehicle is polyethylene glycol.

7. The floss of claim 6 wherein said dressing includes calcium glycero-phosphate.

8. The floss of claim 7 wherein said dressing includes an encapsulated flavoring material.

9. The floss of claim 8 wherein said phosphate acid buffer includes an acid selected from the group consisting of sodium dyhydrogen phosphate and phosphoric acid.

* * * * *